United States Patent [19]
O'Keeffe et al.

[11] Patent Number: 5,910,620
[45] Date of Patent: Jun. 8, 1999

[54] FIRE-RATED GLASS AND METHOD FOR MAKING SAME

[75] Inventors: William F. O'Keeffe, San Francisco; Mason Scott Foote, Sausalito, both of Calif.

[73] Assignee: O'Keefe's, Inc., San Francisco, Calif.

[21] Appl. No.: 08/552,719

[22] Filed: Nov. 3, 1995

[51] Int. Cl.⁶ .................................................. C03B 27/00
[52] U.S. Cl. ............................. 65/60.5; 65/104; 65/114; 65/116
[58] Field of Search ........................ 65/60.5, 104, 116, 65/114

[56] References Cited

U.S. PATENT DOCUMENTS

| | | | |
|---|---|---|---|
| 2,443,548 | 6/1948 | Wilson | 52/126.3 |
| 3,300,919 | 1/1967 | Hiller | 52/126.4 |
| 3,341,399 | 9/1967 | Hazdra et al. | 428/429 |
| 3,453,790 | 7/1969 | Harris | 52/143 |
| 3,900,686 | 8/1975 | Ammons et al. | 428/425.5 |
| 4,020,217 | 4/1977 | Karasudani et al. | 428/427 |
| 4,040,882 | 8/1977 | LeGrand et al. | 156/106 |
| 4,164,107 | 8/1979 | Kraemling | 52/232 |
| 4,164,108 | 8/1979 | Ortmanns | 52/232 |
| 4,173,668 | 11/1979 | Hentzelt eet al. | 428/34 |
| 4,264,681 | 4/1981 | Girard et al. | 428/429 |
| 4,424,653 | 1/1984 | Heinen | 52/204.55 |
| 4,601,143 | 7/1986 | O'Keefe et al. | 52/171.3 |
| 5,028,759 | 7/1991 | Finley | 219/203 |

FOREIGN PATENT DOCUMENTS 1503290 3/1978 United Kingdom .

OTHER PUBLICATIONS

Brochure—Performance Specifications for Contraflam 20–120, Glassprotec a division of O'Keeffe's Inc., San Farncisco, CA, Oct. 1, 1992, 2 pages.
Brochure—Firelite™ and Firelite Plus™, Nippon Electric Glass Co., Ltd., Kirkland, WA, Sep. 1993, 8 pages.
Report—TE 83774 Fire Resistance Testt, Vetrotech AG, CH–6318 Walchwil, Switzerland, Nov. 1993, 24 pages.
Brochure—Fire Protection Glass, Saint–Gobain Exprover S.A., Brussels, Belgium, Apr. 1995, 12 pages.
Brochure—Securiflam & Contraflam, Saint–Gobain Exprover S.A., Brussels, Belgium, Apr. 1995, 1 pages.
Brochure—Pyrostop®, Technical Glass Products, May 1995, 2 pages.

*Primary Examiner*—Timothy M. Speer
*Attorney, Agent, or Firm*—Fliesler, Dubb, Meyer & Lovejoy LLP

[57] ABSTRACT

A fire-rated glass 28 is comprised of a low-E glass which has been subject to a supertempering treatment.

19 Claims, 2 Drawing Sheets

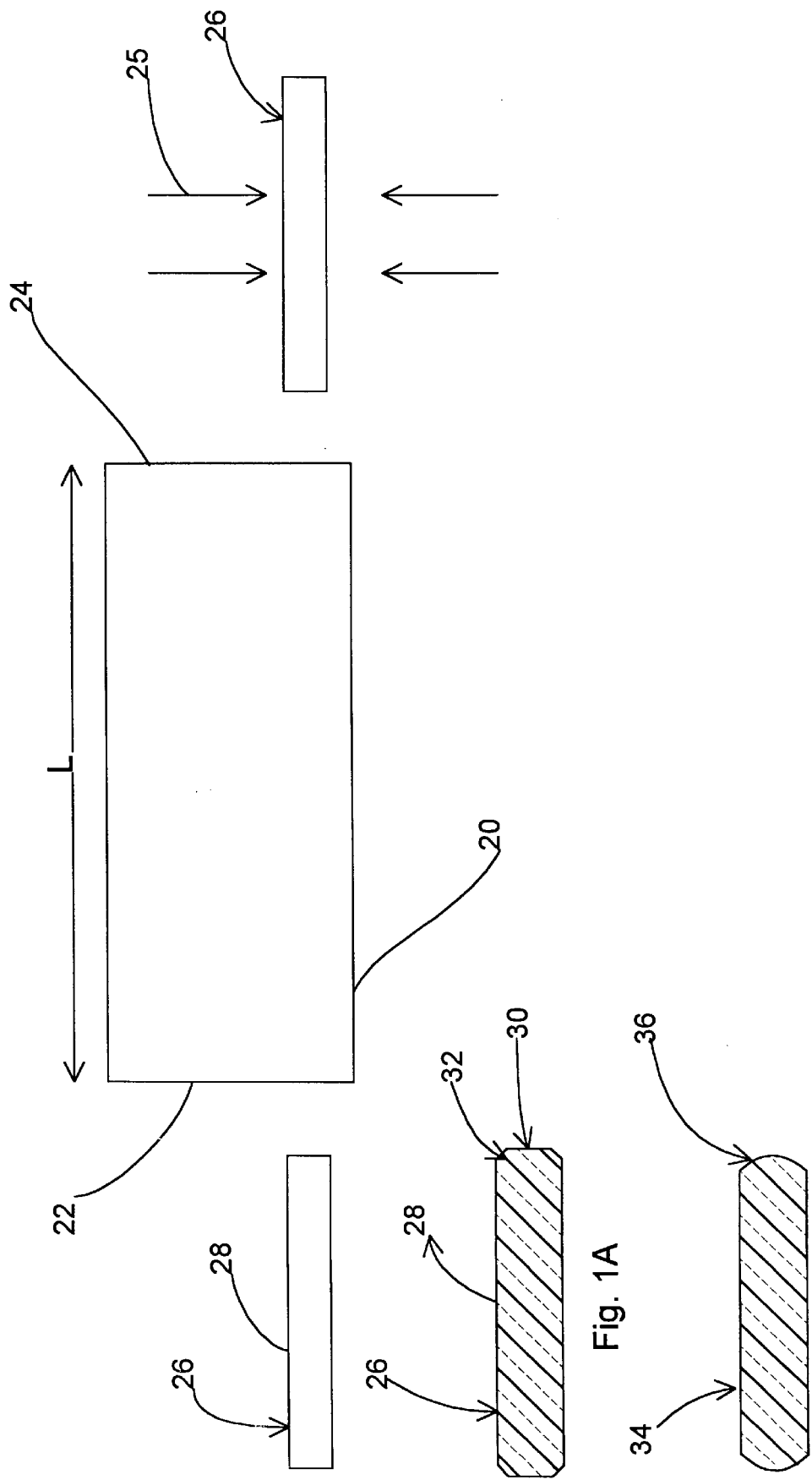

FIRE-RATED GLASS AND METHOD FOR MAKING SAME

BACKGROUND

1. Field of the Invention

The present invention is directed toward fire-rated glass and a method for making the same.

2. Background of the Invention

Fire-rated safety glass allows structures to be configured with glass walls, windows and doors with glass inserts which can withstand exposure to heat and fire for a given temperature and duration. Such safety glass besides offering such protection allows light to enter the structure, adding to the environment. Additionally, the safety glass affords observation of the facilities and people located inside the structure as well as observation by the people located inside the structure of the people and surroundings outside the structure. In security areas, such surveillance abilities, as well as the ability to withstand prolonged heat and fires, are requirements.

Fire-rated glass comes in several varieties. The first well-known variety is glass which has wire imbedded therein. The wire gives additional strength and endurance to the glass. However, the wire detracts from the ability to observe through the glass. Further, this wire gives an industrial feeling to the structure, when a more finished appearance may be desired.

Another type of fire-rated glass includes a configuration having two panes of glass with a gel located between the panes of glass. Products sold in the marketplace under the name SuperLite II™ are so constructed. This glass is architecturally pleasing and is used in specific applications.

Accordingly, there is a need to provide a fire-rated glass which is both architecturally pleasing and that can be used more generally. With such a glass, entire buildings could be constructed in a more fire safe manner as opposed to having the fire-rated glass placed only at strategic locations. Thus, for example, with such a glass, all of the windows of a highrise building as well as all transparent partitioning walls could be economically fire-rated.

SUMMARY OF THE INVENTION

The present invention is directed to fire-rated glass and a method for making said fire-rated glass in such a way that the fire-rated glass is relatively inexpensive and can be used in a wide variety of applications where ordinary annealed glass would normally be used.

The method for making the fire-rated glass comprises the steps of selecting a low-E glass and subjecting the low-E glass to a supertempering treatment. Low-E glass is glass which has been coated with a special material in order to reflect energies such as the rays of the sun. Such low-E glass is used for example in the construction of energy efficient windows in buildings.

The method further includes the selection of a low-E glass which has been coated with a metallic substance. The method also includes selecting a low-E glass which has been coated by one of a sputtering process, a vapor deposition process or a spraying process.

The treatment step of the method further includes supertempering of the glass in order to generate a compression of between 17,000 psi and 23,000 psi between the surface of the low-E glass and the inside of the low-E glass.

The method also includes supertempering the low-E glass in a furnace having a temperature of between about 1125° F. to about 1175°F. Subsequent to the heating process, the low-E glass is cooled. A fluid, such as air, directed toward the glass at a pressure of at least about 55" of water, and preferably 65" of water, is used to cool the low-E glass.

The method further includes heating the low-E glass for a time period dependent on the thickness of the glass.

The invention also includes a fire-rated glass which comprises a low-E glass which has been subjected to a supertempering treatment.

The invention additionally includes a structure comprised of two pieces of supertempered low-E glass which has been spaced apart in a frame. The space between the two pieces of low-E glass, which have been supertempered, can be evacuated or alternatively can be filled with a material in order to provide a laminated structure.

DESCRIPTION OF THE FIGURES

FIG. 1 depicts a schematic view of the method of the invention.

FIGS. 1A and 1B depict cross-sectional embodiments of the low-E glass of the invention with the edges of the low-E glass specially treated.

DETAILED DESCRIPTION OF THE PREFERRED EMBODIMENT

Figure 3:
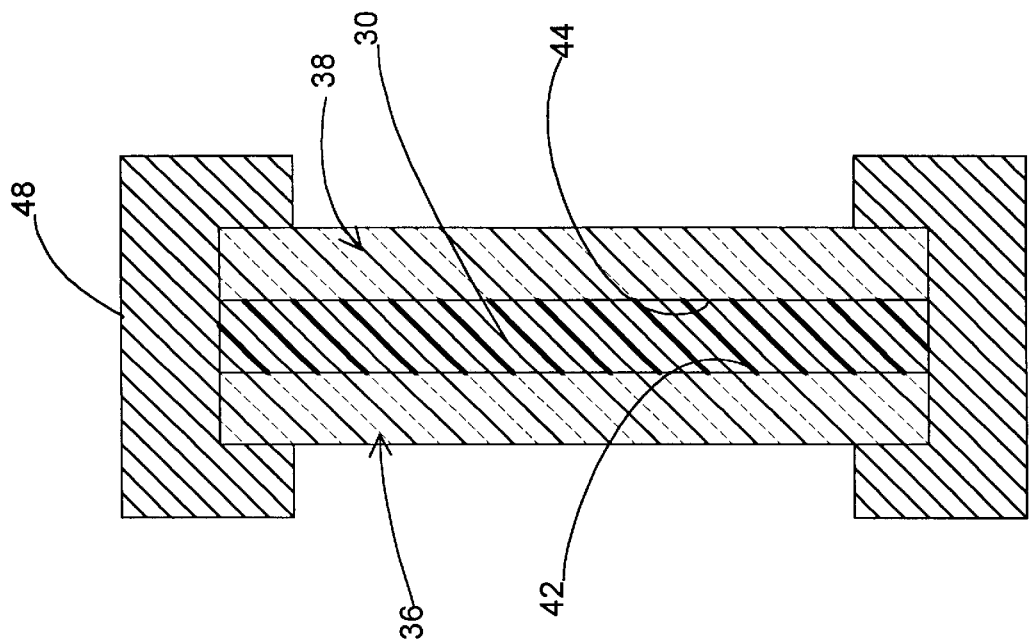
FIG. 3 depicts a sectional view of an alternative structure of the invention built with the supertempered low-E glass of the invention.

With reference to the figures and in particular FIG. 1, the schematic for the method of the invention is depicted. The schematic includes a tempering furnace 20 having a length L. The tempering furnace can be, by way of example only, of a type including a horizontal gas or electrically fueled furnace. Preferably, the length of the furnace is about 190". The glass 26 to be tempered is presented to the furnace at end 22 and emerges from end 24 by way of a conveyering system after the appropriate resident time in the furnace 20.

For the present invention, the furnace is operated in a range of about 1125° F. to about 1175° F., with the preferable temperature being about 1125° F. The glass, which is put through the furnace, has the following desired resident times. For quarter inch glass, the residence time in the furnace is about 255 to 265 seconds.

After the glass exits from the furnace at end 24, the glass is quenched with a stream of fluid 25, generally air, which is preferably directed perpendicularly to the plane of surface of the glass at a pressure of at least about 55" of water and preferably 65" of water. Preferably after the above first quench, a second quench and a third quench is conducted. During the second quench, the glass is subjected to air or other cooling fluid at 45" of water. During the third quench, the glass is subjected to air or other cooling fluid at 25" of water. This treatment causes the glass to cool rapidly and can generate compression of between 17,000 psi to 23,000 psi between the surface of the glass and the inside of the glass.

The glass 26 which is used in the supertempering process for purposes of the method of the invention is a low-E glass. Preferably the low-E glass is coated on one side during the glass formation stage with a material 28 which affords the glass 26 the low-E rating. This material can include for example metals such as for example titanium or steel. A great variety of other materials may be deposited on or in the glass to give it the low-E rating and be usable with this invention. The method for applying this coating to the glass can include the methods of sputtering, vapor deposition or spraying during or after the glass formation steps.

Low-E glass can be acquired from a variety of sources. One source of example is that of Libbey-Owens-Ford Company. Such LOF glass is sold in a variety of sizes and with a variety of coatings having different colors. Such glass allows visible light to pass while reflecting solar energy to keep the environment contained in the glass cooler than would be the case if ordinary window glass were used.

Such low-E glass is selected and cut to the appropriate size. The low-E glass needs to be checked for imperfections such as pits and inclusions. The edges of the glass as demonstrated in FIGS. 1A and 1B are then polished. Any unpolished edge or for that matter any pits or inclusions or other imperfections could leave a rough spot where higher levels of temperatures and pressures, which are experienced during the supertempering process or in an actual fire, could cause failure. In a preferred embodiment, the edges 30 are flat polished at 90° to the surface of the glass 26 as shown in FIG. 1A. There is a 45° bevel or aris 32 placed on both sides of the edge 30. In an altered embodiment the low-E glass 34 can have a rounded edge 36. This rounded technique is known as a pencil polished finish as opposed to a flat polished finish as shown in FIG. 1A.

Once the fire-rated glass is produced, according to the above method, the glass can be assembled into a structure for installation. As the glass can grow or expand in length and width during exposure to heat, preferably a quarter inch separation is required between the glass and the edge of any wood, steel, or aluminum frame, or other frame, which is used to install the glass as a door, window or wall.

Figure 2:
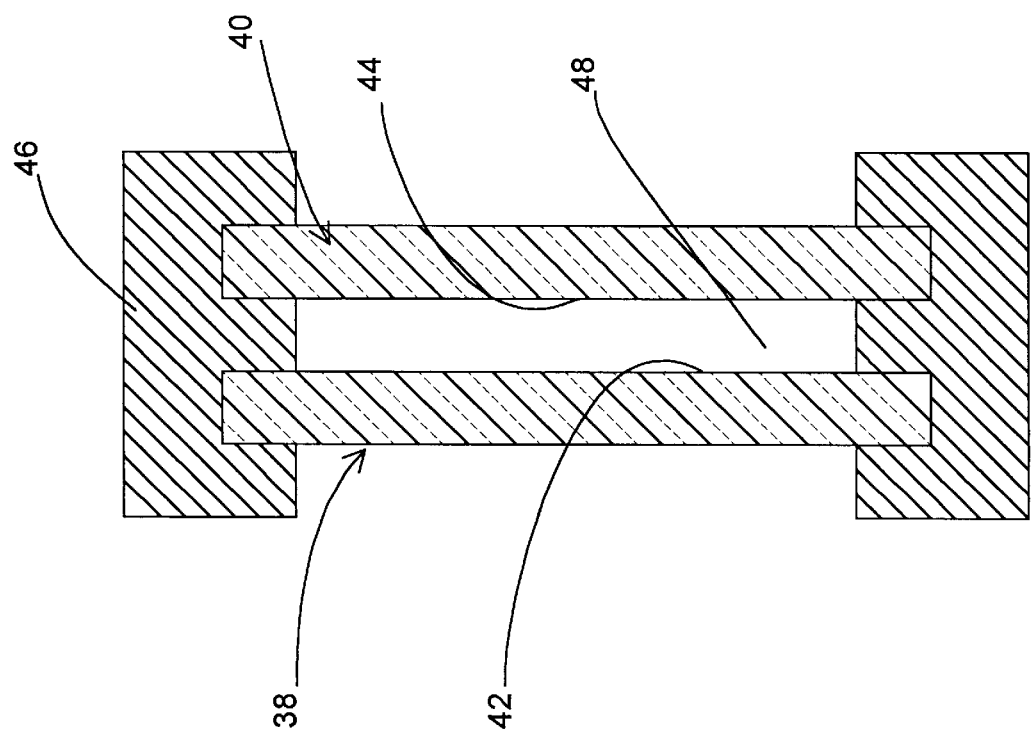
FIG. 2 depicts a sectional view of a structure built with the supertempered low-E glass of the method of the invention.

As can be seen in FIGS. 2 and 3, two panes of supertempered low-E glass 38, 40, with the low-E surfaces indicated by numerals 42, 44 are presented. The glass is spaced apart and held in a frame 46, 48 which preferably is comprised of metal such as aluminum. In the embodiment of FIG. 2, the space 48 between the two panes of glass 38, 40, is evacuated in order to increase the thermal resistivity or the ability of the two panes of glass to insulate thermally.

The embodiment of FIG. 3 uses the same two panes of glass 36, 38 with a frame 48. The space 50 between the two panes of glass 36, 38, is filled with a material in order to provide a laminate of that material and the two panes of glass. The material can be poured in place or can be of a more solid nature and assembled between the panes of glass and frame 48. The material poured in space 50 can include by way of example only resins, or polyvinyl butyral (pvb) or polyethylene terephthalate (pet).

Industrial Applicability

Using the above method, the fire-rated supertempered low-E glass can be manufactured and used to economically build fire-rated partitions and structures. Further fire-rated glass can be substituted in the place of ordinary glass to make buildings and other structures more fire safe.

We claim:

1. A method for making a fire-rated glass comprising the steps of:
   selecting a low-E glass;
   subjecting the low-E glass to a supertempering treatment; and
   wherein said supertempering treatment includes treating the low-E glass in a furnace with a temperature of at least about 1125° F. and quenching the low-E glass with a fluid at a pressure of at least about 55 inches of water.

2. The method of claim 1 including the steps of:
   said selecting step includes selecting as the low-E glass a glass which has been coated with a substance.

3. The method of claim 1 including the step of:
   said selecting step includes selecting as the low-E glass a glass which has been coated with a substance through a sputtering process.

4. The method of claim 1 including the step of:
   said selecting step including selecting as the low-E glass a glass which has been coated with a substance through a vapor deposition process.

5. The method of claim 1 including the step of:
   said selecting step including selecting as the low-E glass a glass which has been coated with a substance through a spraying process.

6. The method of claim 1 including the step of:
   said subjecting step includes placing the glass in a furnace and applying a cooling fluid to the glass exiting the furnace in order to supertemper the glass.

7. The method of claim 1 including the step of:
   polishing the edges of the low-E glass prior to the supertempering treatment step.

8. The method of claim 1 including the step of:
   checking the low-E glass for imperfections prior to the supertempering treatment step.

9. The method of claim 1 including the step of:
   said supertempering step including treating the low-E glass in a furnace with a temperature of between about 1125° F. to about 1175° F.

10. The method of claim 1 including the step of:
    said supertempering step including treating the low-E glass in a tempering furnace followed by cooling the low-E glass with a fluid at a pressure of about 65 inches of water.

11. The method of claim 1 including the step of:
    said supertempering step including treating the low-E glass in a furnace followed by cooling the low-E glass (1) with a first quenching step with a fluid at a pressure of about 55 inches to 65 inches of water, (2) with a second quenching step with a fluid at a pressure of about 45 inches of water, and (3) with a third quenching step with a fluid at a pressure of about 25 inches of water.

12. The method of claim 1 including the step of:
    said supertempering step including treating the low-E glass in a furnace for about 255 seconds to about 265 seconds for a low-E glass of about one quarter inches thick.

13. The method of claim 1 wherein:
    said selecting step includes selecting as the low-E glass a glass coated with one of titanium or steel.

14. The method of claim 1 including the steps of:
    subjecting a first piece and a second piece of low-E glass to the tempering treatment; and
    combining the first piece and second piece of low-E glass into a structure.

15. The method of claim 14 including the step of:
    spacing the first piece and the second piece of low-E glass from each other and evacuating the space between the first and second pieces of low-E glass.

16. The method of claim including the step of:
    placing a laminating material between the first piece and the second piece of low-E glass.

17. The method of claim 14 including the step of:

placing the first piece and the second piece of low-E glass substantially parallel to each other in said structure.

18. The method of claim 17 including the step of placing a first low-E surface of the first piece of low-E glass facing a second low-E surface of the second piece of low-E glass.

19. A method for making a fire-rated glass comprising the steps of:

selecting a low-E glass; and subjecting the low-E glass to a supertempering treatment; and wherein said supertempering treatment includes treating the low-E glass is a furnace with a temperature of about 1125° F. and higher and quenching the low-E glass with a fluid at a pressure of about 55 inches to about 65 inches of water.

* * * * *

UNITED STATES PATENT AND TRADEMARK OFFICE
CERTIFICATE OF CORRECTION

| | | |
|---|---|---|
| PATENT NO. | : 5,910,620 | Page 1 of 1 |
| APPLICATION NO. | : 08/552719 | |
| DATED | : June 8, 1999 | |
| INVENTOR(S) | : O'Keeffe et al. | |

It is certified that error appears in the above-identified patent and that said Letters Patent is hereby corrected as shown below:

On the title page, at item [73], replace "O'Keefe's, Inc." with --O'Keeffe's, Inc.--.

Signed and Sealed this

Sixth Day of February, 2007

JON W. DUDAS
*Director of the United States Patent and Trademark Office*